(12) United States Patent
Georgiev

(10) Patent No.: US 9,549,107 B2
(45) Date of Patent: Jan. 17, 2017

(54) AUTOFOCUS FOR FOLDED OPTIC ARRAY CAMERAS

(71) Applicant: QUALCOMM Incorporated, San Diego, CA (US)

(72) Inventor: Todor Georgiev Georgiev, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/742,017

(22) Filed: Jun. 17, 2015

(65) Prior Publication Data

US 2015/0373252 A1    Dec. 24, 2015

Related U.S. Application Data

(60) Provisional application No. 62/015,333, filed on Jun. 20, 2014.

(51) Int. Cl.
*H04N 5/225* (2006.01)
*G03B 17/17* (2006.01)
(Continued)

(52) U.S. Cl.
CPC .............. *H04N 5/2253* (2013.01); *G03B 3/06* (2013.01); *G03B 13/36* (2013.01); *G03B 17/17* (2013.01);
(Continued)

(58) Field of Classification Search
CPC ................ H04N 5/23212; G03B 13/32–13/36; G03B 3/06; G02B 7/04; G02B 7/09; G02B 7/10; G02B 7/28; G02B 13/0065
See application file for complete search history.

(56) References Cited

U.S. PATENT DOCUMENTS

| 4,114,171 A | 9/1978 | Altman |
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |
| 5,012,273 A | 4/1991 | Nakamura et al. |
| 5,016,109 A | 5/1991 | Gaylord |

(Continued)

FOREIGN PATENT DOCUMENTS

| CN | 101201459 A | 6/2008 |
| CN | 101581828 A | 11/2009 |

(Continued)

OTHER PUBLICATIONS

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

(Continued)

*Primary Examiner* — Paul Berardesca
(74) *Attorney, Agent, or Firm* — Knobbe, Martens, Olson & Bear LLP

(57) ABSTRACT

Aspects relate to autofocus systems and techniques for an array camera having a low-profile height, for example approximately 4 mm. A voice coil motor (VCM) can be positioned proximate to a folded optic assembly in the array camera to enable vertical motion of a second light directing surface for changing the focal position of the corresponding sensor. A driving member can be positioned within the coil of the VCM to provide vertical movement, and the driving member can be coupled to the second light directing surface, for example by a lever. Accordingly, the movement of the VCM driving member can be transferred to the second light directing surface across a distance, providing autofocus capabilities without increasing the overall height of the array camera.

26 Claims, 12 Drawing Sheets

(51) Int. Cl.
  *G03B 3/06* (2006.01)
  *H04N 5/235* (2006.01)
  *G03B 13/36* (2006.01)
  *H04N 5/232* (2006.01)
  *H04N 5/238* (2006.01)

(52) U.S. Cl.
  CPC .......... *H04N 5/2254* (2013.01); *H04N 5/2257* (2013.01); *H04N 5/2258* (2013.01); *H04N 5/2259* (2013.01); *H04N 5/238* (2013.01); *H04N 5/2355* (2013.01); *H04N 5/23212* (2013.01); *G03B 2205/0069* (2013.01)

(56) References Cited

U.S. PATENT DOCUMENTS

| | | | |
|---|---|---|---|
| 5,063,441 | A | 11/1991 | Lipton et al. |
| 5,142,357 | A | 8/1992 | Lipton et al. |
| 5,194,959 | A | 3/1993 | Kaneko et al. |
| 5,207,000 | A | 5/1993 | Chang et al. |
| 5,231,461 | A | 7/1993 | Silvergate et al. |
| 5,243,413 | A | 9/1993 | Gitlin et al. |
| 5,313,542 | A | 5/1994 | Castonguay |
| 5,475,617 | A | 12/1995 | Castonguay |
| 5,539,483 | A | 7/1996 | Nalwa |
| 5,606,627 | A | 2/1997 | Kuo |
| 5,614,941 | A | 3/1997 | Hines |
| 5,640,222 | A | 6/1997 | Paul |
| 5,642,299 | A | 6/1997 | Hardin et al. |
| 5,686,960 | A | 11/1997 | Sussman et al. |
| 5,721,585 | A | 2/1998 | Keast et al. |
| 5,734,507 | A | 3/1998 | Harvey |
| 5,745,305 | A | 4/1998 | Nalwa |
| 5,793,527 | A | 8/1998 | Nalwa |
| 5,903,306 | A | 5/1999 | Heckendorn et al. |
| 5,926,411 | A | 7/1999 | Russell |
| 5,990,934 | A | 11/1999 | Nalwa |
| 6,111,702 | A | 8/2000 | Nalwa |
| 6,115,176 | A | 9/2000 | Nalwa |
| 6,128,143 | A | 10/2000 | Nalwa |
| 6,141,145 | A | 10/2000 | Nalwa |
| 6,144,501 | A | 11/2000 | Nalwa |
| 6,195,204 | B1 | 2/2001 | Nalwa |
| 6,219,090 | B1 | 4/2001 | Nalwa |
| 6,285,365 | B1 | 9/2001 | Nalwa |
| 6,356,397 | B1 | 3/2002 | Nalwa |
| 6,611,289 | B1 | 8/2003 | Yu et al. |
| 6,628,897 | B2 | 9/2003 | Suzuki |
| 6,650,774 | B1 | 11/2003 | Szeliski |
| 6,700,711 | B2 | 3/2004 | Nalwa |
| 6,701,081 | B1 | 3/2004 | Dwyer et al. |
| 6,768,509 | B1 | 7/2004 | Bradski et al. |
| 6,775,437 | B2 | 8/2004 | Kazarinov et al. |
| 6,798,406 | B1 | 9/2004 | Jones et al. |
| 6,809,887 | B1 | 10/2004 | Gao et al. |
| 6,850,279 | B1 | 2/2005 | Scherling |
| 6,855,111 | B2 | 2/2005 | Yokoi et al. |
| 6,861,633 | B2 | 3/2005 | Osborn |
| 7,006,123 | B2 | 2/2006 | Yoshikawa et al. |
| 7,039,292 | B1 | 5/2006 | Breiholz |
| 7,084,904 | B2 | 8/2006 | Liu et al. |
| 7,116,351 | B2 | 10/2006 | Yoshikawa |
| 7,215,479 | B1 | 5/2007 | Bakin |
| 7,253,394 | B2 | 8/2007 | Kang |
| 7,271,803 | B2 | 9/2007 | Ejiri et al. |
| 7,336,299 | B2 | 2/2008 | Kostrzewski et al. |
| 7,612,953 | B2 | 11/2009 | Nagai et al. |
| 7,710,463 | B2 | 5/2010 | Foote |
| 7,805,071 | B2 | 9/2010 | Mitani |
| 7,817,354 | B2 | 10/2010 | Wilson et al. |
| 7,893,957 | B2 | 2/2011 | Peters et al. |
| 7,961,398 | B2 | 6/2011 | Tocci |
| 8,004,557 | B2 | 8/2011 | Pan |
| 8,098,276 | B2 | 1/2012 | Chang et al. |
| 8,115,813 | B2 | 2/2012 | Tang |
| 8,139,125 | B2 | 3/2012 | Scherling |
| 8,228,417 | B1 | 7/2012 | Georgiev et al. |
| 8,267,601 | B2 | 9/2012 | Campbell et al. |
| 8,284,263 | B2 | 10/2012 | Oohara et al. |
| 8,294,073 | B1 | 10/2012 | Vance et al. |
| 8,356,035 | B1 | 1/2013 | Baluja et al. |
| 8,400,555 | B1 | 3/2013 | Georgiev et al. |
| 8,482,813 | B2 | 7/2013 | Kawano et al. |
| 8,791,984 | B2 | 7/2014 | Jones et al. |
| 8,988,564 | B2 | 3/2015 | Webster et al. |
| 2001/0028482 | A1 | 10/2001 | Nishioka |
| 2002/0070365 | A1 | 6/2002 | Karellas |
| 2002/0136150 | A1 | 9/2002 | Mihara et al. |
| 2003/0024987 | A1 | 2/2003 | Zhu |
| 2003/0038814 | A1 | 2/2003 | Blume |
| 2003/0214575 | A1 | 11/2003 | Yoshikawa |
| 2004/0021767 | A1 | 2/2004 | Endo et al. |
| 2004/0066449 | A1 | 4/2004 | Givon |
| 2004/0105025 | A1 | 6/2004 | Scherling |
| 2004/0183907 | A1 | 9/2004 | Hovanky et al. |
| 2004/0246333 | A1 | 12/2004 | Steuart et al. |
| 2004/0263611 | A1 | 12/2004 | Cutler |
| 2005/0053274 | A1 | 3/2005 | Mayer et al. |
| 2005/0057659 | A1 | 3/2005 | Hasegawa |
| 2005/0081629 | A1 | 4/2005 | Hoshal |
| 2005/0111106 | A1 | 5/2005 | Matsumoto et al. |
| 2005/0185711 | A1 | 8/2005 | Pfister et al. |
| 2005/0218297 | A1 | 10/2005 | Suda et al. |
| 2006/0023074 | A1 | 2/2006 | Cutler |
| 2006/0023106 | A1 | 2/2006 | Yee et al. |
| 2006/0023278 | A1 | 2/2006 | Nishioka |
| 2006/0140446 | A1 | 6/2006 | Luo et al. |
| 2006/0193509 | A1 | 8/2006 | Criminisi et al. |
| 2006/0215054 | A1 | 9/2006 | Liang et al. |
| 2006/0215903 | A1 | 9/2006 | Nishiyama |
| 2006/0238441 | A1 | 10/2006 | Benjamin et al. |
| 2007/0024739 | A1 | 2/2007 | Konno |
| 2007/0058961 | A1 | 3/2007 | Kobayashi et al. |
| 2007/0064142 | A1 | 3/2007 | Misawa et al. |
| 2007/0085903 | A1 | 4/2007 | Zhang |
| 2007/0164202 | A1 | 7/2007 | Wurz et al. |
| 2007/0216796 | A1 | 9/2007 | Lenel et al. |
| 2007/0242152 | A1 | 10/2007 | Chen |
| 2007/0263115 | A1 | 11/2007 | Horidan et al. |
| 2007/0268983 | A1 | 11/2007 | Elam |
| 2008/0088702 | A1 | 4/2008 | Linsenmaier et al. |
| 2008/0117289 | A1 | 5/2008 | Schowengerdt et al. |
| 2008/0218612 | A1 | 9/2008 | Border et al. |
| 2008/0259172 | A1 | 10/2008 | Tamaru |
| 2008/0266404 | A1 | 10/2008 | Sato |
| 2008/0290435 | A1 | 11/2008 | Oliver et al. |
| 2008/0291543 | A1 | 11/2008 | Nomura et al. |
| 2008/0297612 | A1 | 12/2008 | Yoshikawa |
| 2008/0316301 | A1 | 12/2008 | Givon |
| 2009/0003646 | A1 | 1/2009 | Au et al. |
| 2009/0005112 | A1 | 1/2009 | Sorek et al. |
| 2009/0015812 | A1 | 1/2009 | Schultz et al. |
| 2009/0051804 | A1 | 2/2009 | Nomura et al. |
| 2009/0085846 | A1 | 4/2009 | Cho et al. |
| 2009/0096994 | A1 | 4/2009 | Smits |
| 2009/0153726 | A1 | 6/2009 | Lim |
| 2009/0160931 | A1 | 6/2009 | Pockett et al. |
| 2009/0268983 | A1 | 10/2009 | Stone et al. |
| 2009/0296984 | A1 | 12/2009 | Nijim et al. |
| 2009/0315808 | A1 | 12/2009 | Ishii |
| 2010/0044555 | A1 | 2/2010 | Ohara et al. |
| 2010/0045774 | A1 | 2/2010 | Len et al. |
| 2010/0066812 | A1 | 3/2010 | Kajihara et al. |
| 2010/0165155 | A1 | 7/2010 | Chang |
| 2010/0202766 | A1 | 8/2010 | Takizawa et al. |
| 2010/0215249 | A1 | 8/2010 | Heitz et al. |
| 2010/0232681 | A1 | 9/2010 | Fujieda et al. |
| 2010/0259655 | A1 | 10/2010 | Takayama |
| 2010/0265363 | A1 | 10/2010 | Kim |
| 2010/0278423 | A1 | 11/2010 | Itoh et al. |
| 2010/0289878 | A1 | 11/2010 | Sato et al. |
| 2010/0302396 | A1 | 12/2010 | Golub et al. |
| 2010/0309286 | A1 | 12/2010 | Chen et al. |
| 2010/0309333 | A1 | 12/2010 | Smith et al. |

(56) References Cited

U.S. PATENT DOCUMENTS

| | | |
|---|---|---|
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0070055 A1 | 3/2013 | Atanassov et al. |
| 2013/0141802 A1 | 6/2013 | Yang |
| 2013/0222556 A1 | 8/2013 | Shimada |
| 2013/0229529 A1 | 9/2013 | Lablans |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1* | 7/2014 | Laroia ............... G06T 11/60 348/360 |
| 2015/0049172 A1 | 2/2015 | Ramachandra et al. |
| 2015/0177524 A1 | 6/2015 | Webster et al. |
| 2015/0244934 A1 | 8/2015 | Duparre et al. |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |
| 2015/0373262 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |

FOREIGN PATENT DOCUMENTS

| | | |
|---|---|---|
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2010041381 A | 2/2010 |
| JP | 2010067014 A | 3/2010 |
| JP | 2010128820 A | 6/2010 |
| JP | 2010524279 A | 7/2010 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Partial International Search Report—PCT/US2015/036409—ISA/EPO—Aug. 24, 2015.

Shuchun Y., et al., "Preprocessing for stereo vision based on LOG filter", Proceedings of 2011 6th International Forum on Strategic Technology, Aug. 2011, XP055211077, pp. 1074-1077.

Arican, et al., "Intermediate View Generation for Perceived Depth Adjustment of Sterio Video", Mitsubishi Electric Research Laboratories, http://www.merl.com, TR2009-052, Sep. 2009; 12 pages.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Ricoh Imagine Change: "New Ricoh Theta Model, Capturing 360-degree Images in One Shot, is on Sale Soon—Spherical Video Function, API and SDK (Beta Version)", News Release, 2014, 3 pages.

Sun W.S., et al., "Single-Lens Camera Based on a Pyramid Prism Array to Capture Four Images," Optical Review, 2013, vol. 20 (2), pp. 145-152.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

International Search Report and Written Opinion—PCT/US2015/036409—ISA/EPO—Nov. 20, 2015.

Kawanishi T., et al., "Generation of High-Resolution Stereo Panoramic Images by Omnidirectional Imaging Sensor Using Hexagonal Pyramidal Mirrors", Pattern Recognition, 1998 Proceedings, Fourteenth International Conference on Brisbane, Qld., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

* cited by examiner

AUTOFOCUS FOR FOLDED OPTIC ARRAY CAMERAS

RELATED APPLICATIONS

The present application claims the benefit under 35 U.S.C. §119(e) of U.S. Provisional Patent Application No. 62/015,333, filed Jun. 20, 2014, and titled "AUTOFOCUS FOR FOLDED OPTIC ARRAY CAMERAS," the contents of which is hereby incorporated by reference herein in its entirety.

TECHNICAL FIELD

The present disclosure relates to imaging systems and methods that include a multi-camera array. In particular, the disclosure relates to systems and methods that enable low-profile imaging systems and mobile devices while maintaining or improving image quality.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. Folded optic image sensor arrays ("array cameras") allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements.

Some array cameras employ a central mirror or prism with multiple facets to split incoming light comprising the target image into multiple portions for capture by the sensors in the array, wherein each facet directs a portion of the light from the target image toward a sensor in the array. Each portion of the split light may be passed through a lens assembly and reflected off of a surface positioned directly above or below a sensor, such that each sensor captures a portion of the image. The sensor fields of view can overlap to assist in stitching together the captured portions into a complete image.

SUMMARY

The autofocus systems and techniques described herein allow for autofocus of multiple cameras in a low-profile, folded optic array camera. Autofocus presents a challenge with folded optic array cameras, particularly when the array camera height is constrained, for example to about 4-5 mm. Due to the reflection of light off of multiple surfaces toward multiple sensors and the height limitations on the camera, traditional autofocus modules and techniques are not adapted for such folded optic low-profile sensor arrays. For example, moving an autofocus lens assembly up and down over each sensor would increase the height of the system as well as changing the relative positioning of the optical axes of the sensors. Even the smallest voice coil motors (VCM) have too great of a side length (approximately 7.5 mm) to use for driving a lens assembly back and forth between a central mirror or prism and a sensor, due to the height constraints of the array camera. The alternative, piezo stepper motors, are expensive and noisy and operate slowly and less reliably.

The above-described problems, among others, are addressed in certain embodiments of folded optic array camera autofocus systems and techniques as described herein. The array camera embodiments for use with the autofocus systems and techniques may employ a central mirror or prism, for example with multiple surfaces or facets, to split incoming light comprising the target image into multiple portions for capture by the sensors in the array, referred to herein as a "first light directing surface." Each portion of the split light may be passed through a lens assembly and reflected by an additional mirror, or refracted through an additional prism, positioned directly above or below a sensor, such that each sensor captures a portion of the image. The additional reflective or refractive surface is referred to herein as a "second light directing surface." The combination of the first and second light directing surfaces, lens, and sensor are generally referred to herein as a "folded optic assembly."

The examples and embodiments of autofocus systems and methods described herein may use a VCM to enable vertical motion of the second light directing surface for changing the focal position for the corresponding sensor. For example, a VCM can be positioned proximate to a folded optic assembly. A driving member can be positioned within the coil of the VCM to provide vertical movement, and the driving member can be coupled to the second light directing surface, for example by a lever or another mechanical structural member (which in some embodiments may include several structures coupled together, which herein may all be referred to as a "lever"). In some embodiments, the second light directing surface may be secured to a first end of the lever and a counterweight may be secured to a second end of the lever, and the driving member can be secured to a middle portion of the lever. Accordingly, the movement of the VCM driving member can be transferred to the second light directing surface across a distance, providing autofocus capabilities, and such an autofocus mechanism does not require increasing the overall height of the array camera. VCMs are very agile, but require extremely low friction mechanics, and this may be achieved by the lever mechanism.

Each sensor of a multi-sensor imaging system is configured, collectively with other components of the imaging system, to capture an in-focus portion of the target image scene. In some circumstances, each sensor in the array may capture a portion of the image which overlaps slightly with the portions captured by neighboring sensors in the array. These portions may be assembled into the target image, for example by linear blending or other image stitching techniques.

One innovation includes an autofocus module for a folded optic array camera, including an image sensor mounted to a substrate defining a first plane, a first light directing surface, a second light directing surface, the first light directing surface positioned to direct light representing a portion of a target image scene toward second light directing surface and the second light directing surface positioned to direct the light toward the image sensor, an actuator mounted to the substrate and including a driving member positioned for movement in a direction orthogonal to the plane of the substrate; and a lever in contact with the driving member and second light directing surface such that the movement of the driving member is transferred to the second light directing surface.

Embodiments of the autofocus module may include, for example, one or more of the following aspects. In some embodiments the actuator includes a voice coil motor. In some embodiments, the driving member is threaded within a coil of the voice coil motor. The movement in the direction orthogonal to the substantially horizontal plane may be within a range of approximately 120 microns to approximately 150 microns. The autofocus module can further include a lens assembly positioned between the first light directing surface and the second light directing surface. The diameter of the lens assembly may be approximately 4 mm, in some embodiments. The autofocus module may further include a counterweight coupled to a first end of the lever, wherein the driving member is coupled to a middle portion of the lever and the second light directing surface is coupled to a second end of the lever. The weight of the counterweight can be selected to at least partially balance a weight of the second light directing surface. In some embodiments, the second light directing surface comprises one of a reflective mirror and a prism. The autofocus module can further include a strut coupled to a first end of the lever using a hinge. The driving member may be coupled to a middle portion of the lever and the second light directing surface is coupled to a second end of the lever. In some embodiments, the strut is coupled to a structure forming the first light directing surface, and the second light directing is coupled to a middle portion of the lever and the driving member is coupled to a second end of the lever. In some embodiments, a first end of the lever is coupled to a structure forming the first light directing surface, and wherein the second light directing is coupled to a middle portion of the lever and the driving member is coupled to a second end of the lever.

Another innovation is a system for autofocusing a folded optic array camera including a plurality of optical assemblies positioned around a structure providing a corresponding plurality of light folding surfaces, the system comprising, for each of the plurality of optical assemblies an image sensor mounted to a substrate defining a first plane, a second light directing surface, the corresponding light folding surface of the plurality of light folding surface positioned to direct light representing a portion of a target image scene toward second light directing surface and the second light directing surface positioned to direct the light toward the image sensor, an actuator mounted to the substrate and including a driving member positioned for movement in a direction orthogonal to the plane of the substrate, and a lever in contact with the driving member and second light directing surface such that the movement of the driving member is transferred to the second light directing surface. The system may further include a controller including programmable computer instructions for keeping each of the plurality of optical assemblies focused at approximately the same distance, the controller in electronic communication with the actuator of each of the plurality of optical assemblies. In some embodiments, the actuator for an optical assembly of the plurality of optical assemblies is coupled to the optical assembly and at least one adjacent optical assembly of the plurality of optical assemblies. In some embodiments, the plurality of optical assemblies comprises three optical assemblies, and wherein the lever comprises a T-shaped member including a first lever and a second lever, the first lever coupled to the driving member and the second lever, the second lever coupled at a first end to the optical assembly and at a second end to the adjacent optical assembly. In some embodiments, the first lever is coupled at a first end to a counterweight, at a middle portion to the driving member, and at a second end to a middle portion of the second lever. In some embodiments, the plurality of optical assemblies comprises four optical assemblies, and the lever is coupled at a middle portion to the driving member, at a first end to the optical assembly, and at a second end to the adjacent optical assembly.

Another innovation includes a method for capturing an image of a target image scene using a folded optic array camera comprising a plurality of folded optic assemblies mounted to a substrate defining a first plane and positioned around a structure providing a corresponding plurality of light folding surfaces. The method includes, for each of the plurality of folded optic assemblies, causing movement of a driving member of an actuator in a direction orthogonal to the plane of the substrate, transferring the movement of the driving member to a second light directing surface, thereby changing a focal distance of light representing a portion of the target image scene, the corresponding light folding surface of the plurality of light folding surface positioned to direct the light toward the second light directing surface and the second light directing surface positioned to direct the light toward an image sensor, and capturing an image representing the portion of the light using the image sensor. In some embodiments, the movement is accomplished by a lever in contact with the driving member and second light directing surface. The method may further include controlling the movement of the driving member for each of the plurality of folded optic assemblies. In some embodiments, the method further includes keeping each of the plurality of folded optic assemblies focused at approximately the same distance. The method may further include determining an amount of movement for a selected driver assembly of the plurality of folded optic assemblies and using the amount of movement for the selected driver assembly to determine movement for each of the other of the plurality of folded optic assemblies. In some embodiments, determining movement for each of the other of the plurality of folded optic assemblies is based at least partly on the amount of movement for the selected driver assembly and at least partly on one or more coefficients defining a relationship between the plurality of folded optic assemblies. In some embodiments, the method further includes performing a stitching operation on the image representing the portion of the light from each of the plurality of folded optic assemblies to form the image of the target image scene.

Another innovation is a non-transitory computer-readable medium storing instructions that, when executed, cause one or more processors to perform operations including for each of a plurality of folded optic assemblies of a folded optic camera, the plurality of folded optic assemblies mounted to a substrate defining a first plane and positioned around a structure providing a corresponding plurality of light folding surfaces: calculating, based at least partly on a desired focal length, displacement of a driving member of an actuator in a direction orthogonal to the plane of the substrate, the displacement of the driving member calculated to cause a corresponding amount of displacement for a light directing surface positioned to direct light representing a portion of a target image scene toward an image sensor, generating instructions to cause the displacement of the driving member, and providing the instructions to an actuator coupled to the driving member. In some embodiments of the non-transitory computer-readable medium, the operations further include determining a first amount of displacement for the driving member of a selected driver assembly of the plurality of folded optic assemblies. In some embodiments the operations further include determining an adjusted amount of displacement for the driving member of each other assembly of the plurality of folded optic assemblies based at least partly on the first amount of displacement and at least partly on one or more coefficients defining a relationship between the plurality of folded optic assemblies. In some embodiments of the non-transitory computer-readable medium, the operations further include keeping each of the plurality of folded optic assemblies focused at approximately the same distance.

Another innovation is an autofocus module for a folded optic array camera, including an image sensor defining a first plane, the image sensor configured to receive light representing at least a portion of a target image scene, a lens assembly configured to focus the light, the lens assembly having an optical axis, a light directing surface positioned to direct the light received from the lens assembly onto the image sensor, an actuator comprising a driving member positioned for movement in a direction perpendicular to the optical axis of the lens assembly, and means for transferring the movement of the driving member in the direction perpendicular to the optical axis to the second light directing surface for changing an optical path length of the light. The lens assembly can be positioned so that the optical axis runs substantially parallel to the first plane.

In some embodiments, the means for transferring the movement of the driving member includes a lever in contact with the driving member and second light directing surface. In some embodiments, the means for transferring the movement of the driving member further includes a counterweight coupled to a first end of the lever, a middle portion of the lever coupled to the driving member and a second end of the lever coupled to the second light directing surface. The means for transferring the movement of the driving member may further include a strut coupled to a first end of the lever, a middle portion of the lever coupled to the driving member and a second end of the lever coupled to the second light directing surface. In some embodiments, the autofocus module further includes a structure having an additional light directing surface positioned such that the lens assembly is between the additional light directing surface and the light directing surface. In some embodiments, the means for transferring the movement of the driving member further includes a first end of the lever coupled to the driving member, a middle portion of the lever coupled to the light directing surface, and a second end of the lever coupled to the structure comprising the additional light directing surface. In some embodiments, the second end of the lever is coupled to the structure having the additional light directing surface via one or both of a strut and a hinge. In some embodiments, the actuator comprises a voice coil motor. Some embodiments further include a first camera of a plurality of cameras, the first camera comprising the autofocus module having the image sensor, the lens assembly, the light directing surface, the actuator, and the means for transferring the movement of the driving member. In some embodiments, each other camera of the plurality of cameras includes a similar autofocus module to the first camera. In some embodiments, the plurality of cameras are arranged around a central pyramid have a plurality of facets, each of the plurality of facets positioned to direct a portion of light representing the target image scene toward an associated one of the plurality of cameras.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

I. Introduction

Implementations disclosed herein provide systems, methods and apparatus for autofocus in an array camera with folded optics. As described above, a voice coil motor (VCM) can be positioned proximate to a folded optic assembly in an array camera to enable vertical motion of the second light directing surface for changing the focal position of the corresponding sensor. A driving member can be positioned within the coil of the VCM to provide vertical movement, and the driving member can be coupled to the second light directing surface, for example by a lever. In some embodiments, the second light directing surface may be secured to a first end of the lever and a counterweight may be secured to a second end of the lever, and the driving member can be secured to a middle portion of the lever. Accordingly, the movement of the VCM driving member can be transferred to the second light directing surface across a distance, providing autofocus capabilities, and such an autofocus mechanism does not require increasing the overall height of the array camera.

In some examples, a separate VCM can be provided to individually control autofocus for each folded optic assembly in the array camera. In other examples, the levers of a number of VCMs provided for the array camera can be connected, for example by a solid or pivoting mechanical linkage, such that the motion of the driving members of two or more VCMs controls autofocus for each folded optic assembly. In further examples, at least one VCM may be coupled to the second light directing surface of each folded optic assembly in the array, such that motion of the driving member of the at least one VCM controls autofocus for all the folded optic assemblies. In still other examples, a number of VCMs may each be coupled to the second light directing surface of a portion of the folded optic assemblies, such that the motion of the driving member of each VCM controls autofocus for the corresponding portion of the folded optic assemblies.

In the following description, specific details are given to provide a thorough understanding of the examples. However, the examples may be practiced without these specific details.

II. Overview of Folded Optic Array Cameras

Figure 1A:
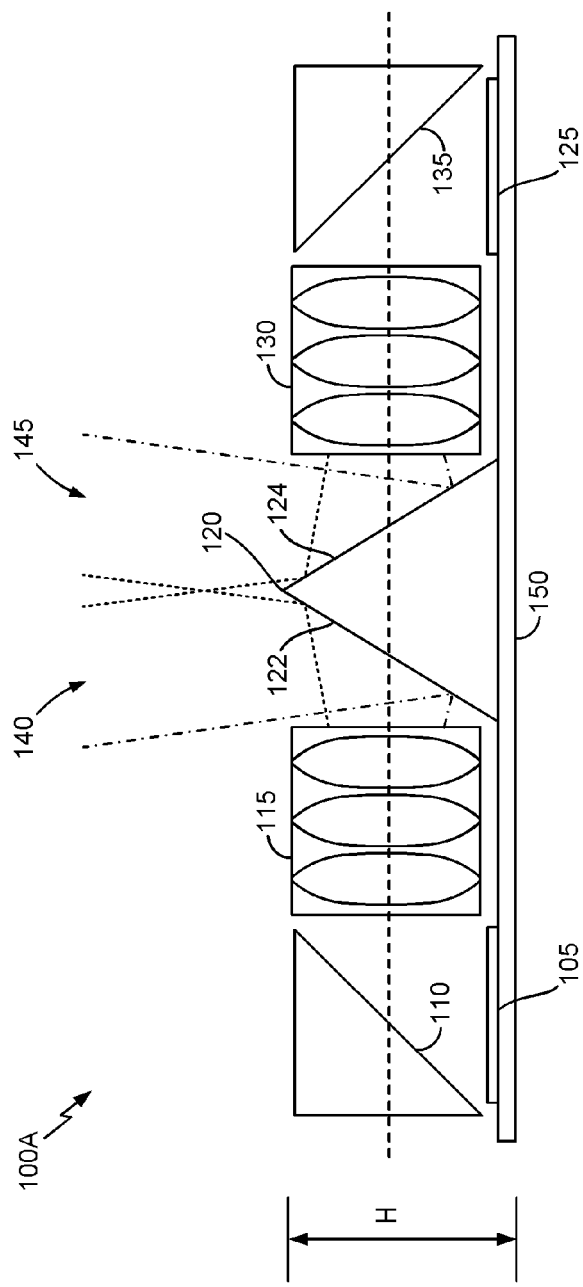
FIG. 1A illustrates a cross-sectional side view of an embodiment of a folded optic sensor assembly.
Figure 1B:
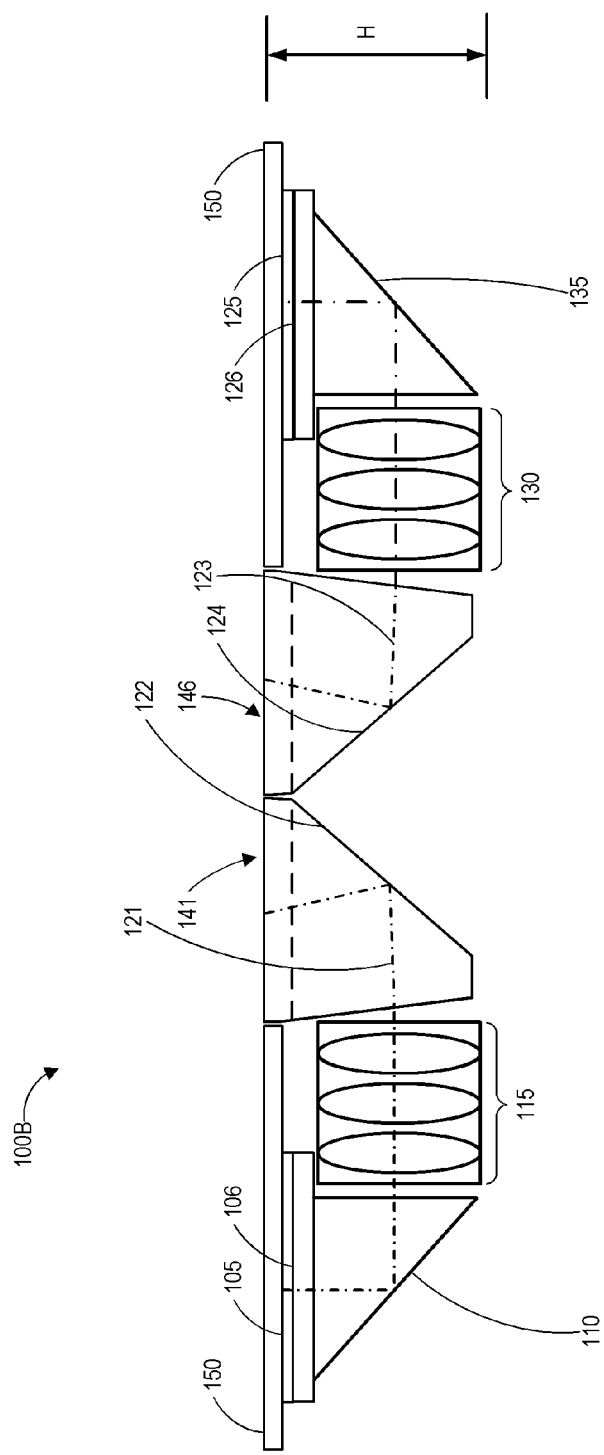
FIG. 1B illustrates a cross-sectional side view of another embodiment of a folded optic sensor assembly.

Referring now to FIGS. 1A and 1B, examples of an a folded optic multi-sensor assembly 100A, 100B suitable for use with the autofocus systems and techniques described herein will now be described in greater detail. FIG. 1A illustrates a cross-sectional side view of an example of a folded optics array 100A including image sensors 105, 125, reflective secondary light folding surfaces 110, 135, lens assemblies 115, 130, and a central reflective surface 120 which may all be mounted to a substrate 150. FIG. 1B illustrates a cross-sectional side view of an embodiment of a folded optic sensor array including central prisms 141, 146 for primary light folding surfaces 122, 124 and additional prisms forming secondary light folding surfaces 135, 110.

Referring to FIG. 1A, the image sensors 105, 125 may comprise, in certain embodiments, a charge-coupled device (CCD), complementary metal oxide semiconductor sensor (CMOS), or any other image sensing device that receives light and generates image data in response to the received image. Each sensor 105, 125 may include a plurality of sensors (or sensor elements) arranged in an array. Image sensors 105, 125 may be able to obtain image data of still photographs and may also provide information regarding motion in a captured video stream. Sensors 105 and 125 may be an individual sensor array, or each may represent arrays of sensors arrays, for example, a 3×1 array of sensor arrays. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

In some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125. The central reflective surface 120 may split light comprising the target image into multiple portions and direct each portion at a different sensor. For example, a first side 122 of the central reflective surface 120 (also referred to as a primary light folding surface, as other embodiments may implement a prism rather than a reflective surface) may send a portion of the light corresponding to a first field of view 140 toward the left sensor 105 while a second side 124 sends a second portion of the light corresponding to a second field of view 145 toward the right sensor 125. It should be appreciated that together the fields of view 140, 145 of the image sensors cover at least the target image.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments central surface may be refractive. For example, central surface may be a prism configured with a plurality of facets, where each facet directs a portion of the light comprising the scene toward one of the sensors.

After being reflected off the central reflective surface 120, at least a portion of incoming light may propagate through each of the lens assemblies 115, 130. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may be a voice coil motor (VCM), micro-electronic mechanical system (MEMS), or a shape memory alloy (SMA). The lens assembly may further comprise a lens driver for controlling the actuator.

In some embodiments, traditional auto focus techniques may be implemented by changing the focal length between the lens 115, 130 and corresponding sensor 105, 125 of each camera. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

Multiple side reflective surfaces, for example, reflective surfaces 110 and 135, can be provided around the central mirror 120 opposite the sensors. After passing through the lens assemblies, the side reflective surfaces 110, 135 (also referred to as a secondary light folding surface, as other embodiments may implement a prism, for example, a refractive prism, rather than a reflective surface) can reflect the light (downward, as depicted in the orientation of FIG. 1A) onto the sensors 105, 125. As depicted, sensor 105 may be positioned beneath reflective surface 110 and sensor 125 may be positioned beneath reflective surface 135. However, in other embodiments, the sensors may be above the side reflected surfaces, and the side reflective surfaces may be configured to reflect light upward (see for example, FIG. 1B). Other suitable configurations of the side reflective surfaces and the sensors are possible in which the light from each lens assembly is redirected toward the sensors. Certain embodiments may enable movement of the side reflective surfaces 110, 135 to change the focus or field of view of the associated sensor.

Each sensor's field of view 140, 145 may be steered into the object space by the surface of the central mirror 120 associated with that sensor. Mechanical methods may be employed to tilt the mirrors and/or move the prisms in the array so that the field of view of each camera can be steered to different locations on the object field. This may be used, for example, to implement a high dynamic range camera, to increase the resolution of the camera system, or to implement a plenoptic camera system. Each sensor's (or each 3×1 array's) field of view may be projected into the object space, and each sensor may capture a partial image comprising a portion of the target scene according to that sensor's field of view. As illustrated in FIG. 1A, in some embodiments, the fields of view 140, 145 for the opposing sensor arrays 105, 125 may overlap by a certain amount 150. To reduce the overlap 150 and form a single image, a stitching process as described below may be used to combine the images from the two opposing sensor arrays 105, 125. Certain embodiments of the stitching process may employ the overlap 150 for identifying common features in stitching the partial images together. After stitching the overlapping images together, the stitched image may be cropped to a desired aspect ratio, for example 4:3 or 1:1, to form the final image. In some embodiments, the alignment of the optical elements relating to each FOV are arranged to minimize the overlap 150 so that the multiple images are formed into a single image with minimal or no image processing required in joining the images.

FIG. 1B illustrates a cross-sectional side view of another embodiment of a folded optic array camera 100B. As shown in FIG. 1B, a sensor assembly 100B includes a pair of image sensors 105, 125 each mounted to substrate 150, lens assemblies 115, 130 corresponding to image sensors 105, 125, respectively, and a secondary light folding surface 110, 135 positioned over the cover glass 106, 126 of image sensors 105, 125, respectively. The primary light folding surface 122 of prism 141 directs a portion of light from the target image scene along optical axis 121 through the lens assembly 115, is redirected off of the secondary light folding surface 110, passes through the cover glass 106, and is incident upon the sensor 105. The primary light folding surface 124 of prism 146 directs a portion of light from the target image scene along optical axis 123 through the lens assembly 130, is redirected off of the secondary light folding surface 135, passes through the cover glass 126, and is incident upon the sensor 125. The folded optic array camera 100B is illustrative of one array camera embodiment implementing prisms instead of the reflective surfaces of the array camera 100A of FIG. 1A. Each of the prisms 141, 146 is provided in an aperture in the substrate 150 such that the primary light directing surfaces 122, 124 are below the plane formed by substrate and receive light representing the target image scene.

The sensors 105, 125 may be mounted on the substrate 150 as shown in FIG. 1B. In some embodiments, all sensors may be on one plane by being mounted to the flat substrate 150. Substrate 150 may be any suitable substantially flat material. The substrate 150 can include an aperture as described above to allow incoming light to pass through the substrate 150 to the primary light folding surfaces 122, 124. Multiple configurations are possible for mounting a sensor array or arrays, as well as the other camera components illustrated, to the substrate 150.

Primary light folding surfaces 122, 124 may be prism surfaces as illustrated, or may be a mirror or a plurality of mirrors, and may be flat or shaped as needed to properly redirect incoming light to the image sensors 105, 125. In some embodiments the primary light folding surfaces 122, 124 may be formed as a central mirror pyramid or prism as illustrated in FIG. 1A. The central mirror pyramid, prism, or other reflective surface may split light representing the target image into multiple portions and direct each portion at a different sensor. For example, a primary light folding surface 122 may send a portion of the light corresponding to a first field of view toward the left sensor 105 while primary light folding surface 124 sends a second portion of the light corresponding to a second field of view toward the right sensor 125. In some embodiments in which the receiving sensors are each an array of a plurality of sensors, the light folding surfaces may be made of multiple reflective surfaces angled relative to one another in order to send a different portion of the target image scene toward each of the sensors. It should be appreciated that together the fields of view of the cameras cover at least the target image, and can be aligned and stitched together after capture to form a final image captured by the synthetic aperture of the array.

Each sensor in the array may have a substantially different field of view, and in some embodiments the fields of view may overlap.

As illustrated by FIGS. 1A and 1B, each array camera has a total height H. In some embodiments, the total height H can be approximately 4.5 mm or less. In other embodiments, the total height H can be approximately 4.0 mm or less. Though not illustrated, the entire array camera 100A, 100B may be provided in a housing having a corresponding interior height of approximately 4.5 mm or less or approximately 4.0 mm or less.

As used herein, the term "camera" refers to an image sensor, lens system, and a number of corresponding light folding surfaces, for example the primary light folding surface 124, lens assembly 130, secondary light folding surface 135, and sensor 125 as illustrated in FIG. 1. A folded-optic multi-sensor array, referred to as an "array" or "array camera," can include a plurality of such cameras in various configurations. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the autofocus systems and techniques described herein are possible.

Figure 2:
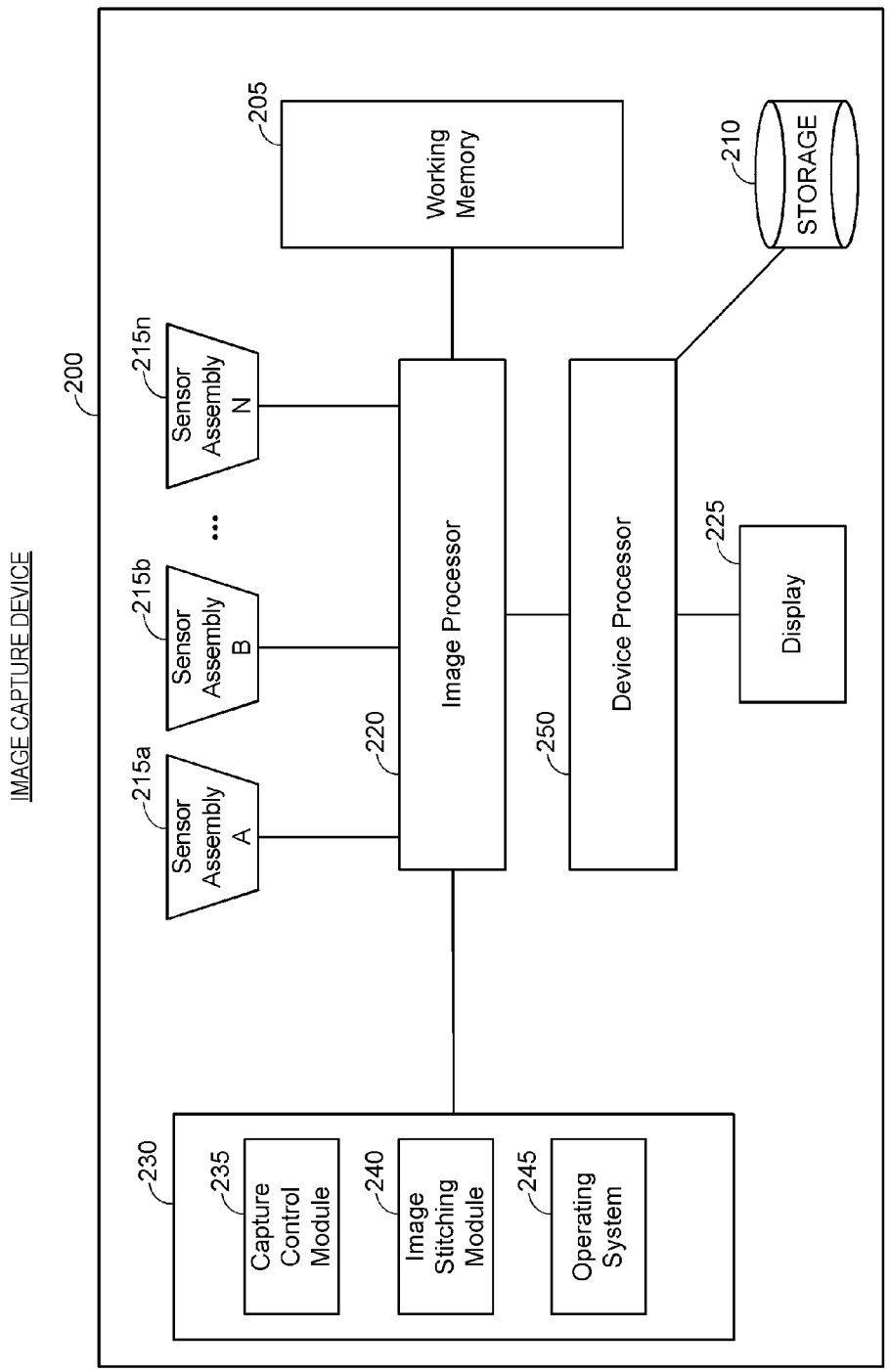
FIG. 2 illustrates a block diagram of one embodiment of an image capture device.

FIG. 2 depicts a high-level block diagram of a device 200 having a set of components including an image processor 220 linked to one or more cameras 215a-n. The image processor 220 is also in communication with a working memory 205, memory component 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-n for capturing external images. The cameras 215a-n may each comprise a sensor, lens assembly, and a primary and secondary reflective or refractive surface for redirecting a portion of a target image to each sensor, as discussed above with respect to FIG. 1. In general, N cameras 215a-n may be used, where N≥2. Thus, the target image may be split into N portions in which each sensor of the N cameras captures one portion of the target image according to that sensor's field of view. It will be understood that cameras 215a-n may comprise any number of cameras suitable for an implementation of the folded optic imaging device described herein. The number of sensors may be increased to achieve lower z-heights of the system, as discussed in more detail below with respect to FIG. 4, or to meet the needs of other purposes, such as having overlapping fields of view similar to that of a plenoptic camera, which may enable the ability to adjust the focus of the image after post-processing. Other embodiments may have a field of view overlap configuration suitable for high dynamic range cameras enabling the ability to capture two simultaneous images and then merge them together. The cameras 215a-n may be coupled to the image processor 220 to communicate captured images to the working memory 205, the device processor 250, to the electronic display 225 and to the storage (memory) 210.

The image processor 220 may be configured to perform various processing operations on received image data comprising N portions of the target image in order to output a high quality stitched image, as will be described in more detail below. Image processor 220 may be a general purpose processing unit or a processor specially designed for imaging applications. Examples of image processing operations include cropping, scaling (e.g., to a different resolution), image stitching, image format conversion, color interpolation, color processing, image filtering (for example, spatial image filtering), lens artifact or defect correction, etc. Image processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, and operating system 245. These modules include instructions that configure the image processor 220 of device processor 250 to perform various image processing and device management tasks. Working memory 205 may be used by image processor 220 to store a working set of processor instructions contained in the modules of memory component 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of cameras 215a-n. Capture control module 235 may further include instructions that control the overall image capture functions of the device 200. For example, capture control module 235 may include instructions that call subroutines to configure the image processor 220 to capture raw image data of a target image scene using the cameras 215a-n. Capture control module 235 may then call the image stitching module 240 to perform a stitching technique on the N partial images captured by the cameras 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above and below. In order to output a single target image, image stitching module 240 may configure the image processor 220 to combine the multiple N partial images to produce a high-resolution target image. Target image generation may occur through known image stitching techniques. Examples of image stitching can be found in U.S. patent application Ser. No. 11/623,050 which is hereby incorporated by reference in its entirety.

For instance, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the cameras 215a-n. Therefore, in some embodiments, instructions contained in the image processing modules discussed above may not interact with these hardware resources directly, but instead interact through standard subroutines or APIs located in operating system component 270. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device

200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory component 230. The processor instructions may be loaded into RAM to facilitate execution by the image processor 220. For example, working memory 205 may comprise RAM memory, with instructions loaded into working memory 205 before execution by the processor 220.

III. Overview of Autofocus Systems and Techniques

Figure 3:
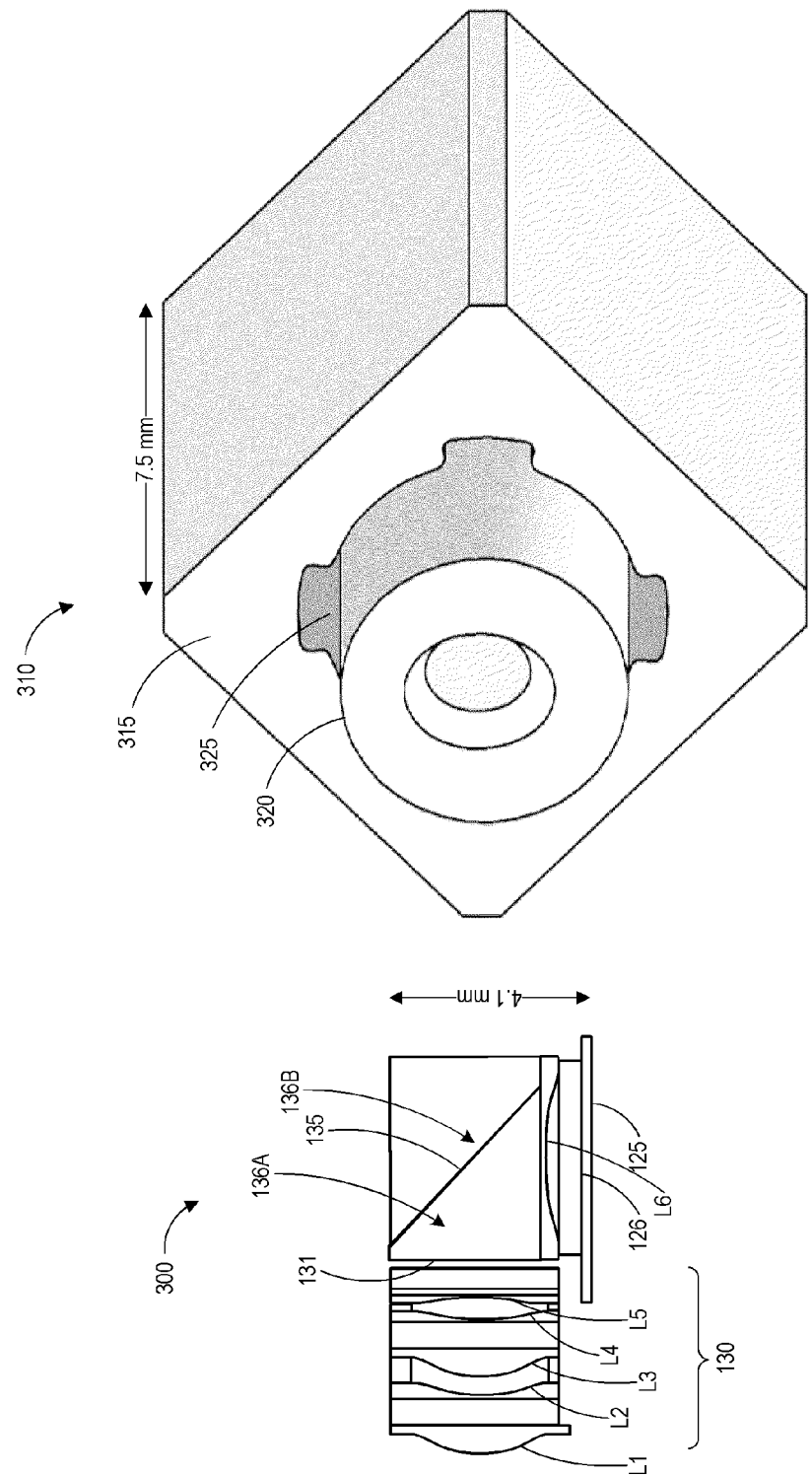
FIG. 3 illustrates a to-scale comparison of one embodiment of a folded optic assembly for an array camera and a voice coil motor.

FIG. 3 illustrates a to-scale comparison of one embodiment of a portion of a folded optic assembly 300 for an array camera and a voice coil motor 310.

The portion of the folded optic assembly 300 includes sensor 125, cover glass 126, a first portion 130 of the lens system including lenses L1, L2, L3, L4, and L5, a second portion of the lens system including lens L6 positioned over cover glass 126, where cover glass 126 is positioned over sensor 125. The portion of the folded optic assembly 300 as illustrated also includes the unit including the prism 136A and block 136B (referred to herein as an "optical element"). In other embodiments, the optical element can include just prism 136A without block 136B or can include a reflective surface such as a mirror. The optical element can function as the secondary light folding surface in the folded optic system for a camera, redirecting light that has passed through the focusing portion 130 of the lens system onto sensor 125.

The lens L6 can be a field corrector lens in some embodiments and can be a stationary component of the L1-L6 lens system. The secondary light folding surface 135 extends away from the lens L6, and as illustrated is formed as a prism 136A coupled to a support block 136B at the secondary light folding surface 135. It is possible that a mirror surface be placed between the 136A and 136B instead of using the internal reflective characteristics of a prism to redirect the light.

As illustrated, the portion of the folded optic assembly 300 can have an overall height of approximately 4.1 mm. In other embodiments the height can range from approximately 4.0 mm to 4.5 mm, and in some embodiments 4 mm or less.

Thin cameras based on folded optics use one or more lenses plus mirrors/prisms to fold the light path and achieve low z-height. Lens diameter for the first lens assembly 130 is along the thickness of the camera and it almost completely determines the overall thickness of the array. This is advantageous for producing a thin camera, but it makes the use of voice coil motors (VCM) for focus and/or autofocus very difficult. This is because the smallest VCM available today, illustrated in FIG. 5 as VCM 310, has a side length of approximately 7.5 mm. Therefore, if it is positioned as intended (with the lens threaded in the position of cylinder 320 inside of the opening 325 in the motor 315), the z-height of the array camera would be more than 7.5 mm thick.

However, VCMs are one of the most effective and successful actuators for focusing mobile cameras. The current alternative for focusing would be piezo stepper motors. However, such motors are more expensive, noisy, slow, and less reliable when compared to VCMs. As a result, piezo motors are rarely used in mobile cameras. Accordingly, VCMs are desirable as actuators for the focus mechanism of an array camera implemented in a mobile device. The to-scale comparison of FIG. 3 illustrates the height increase that would occur if the first lens group 130 of the folded optic assembly 300 would be threaded within the VCM 310, as is conventional when using VCMs for focusing purposes.

FIGS. 4A-4D illustrate various embodiments of a folded optic assembly autofocus system implementing a VCM 160 without significant height increase to the array camera. As illustrated, the overall height H of the folded optic camera is only increased by a small amount due to the movement 190 of the secondary light folding surface 135. In some embodiments, movement 190 can add approximately 120 microns to approximately 150 microns to the folded optic system height H. The folded optic system height H can be approximately 4.5 mm or less or approximately 4.1 mm or less in various embodiments.

Figure 4A:
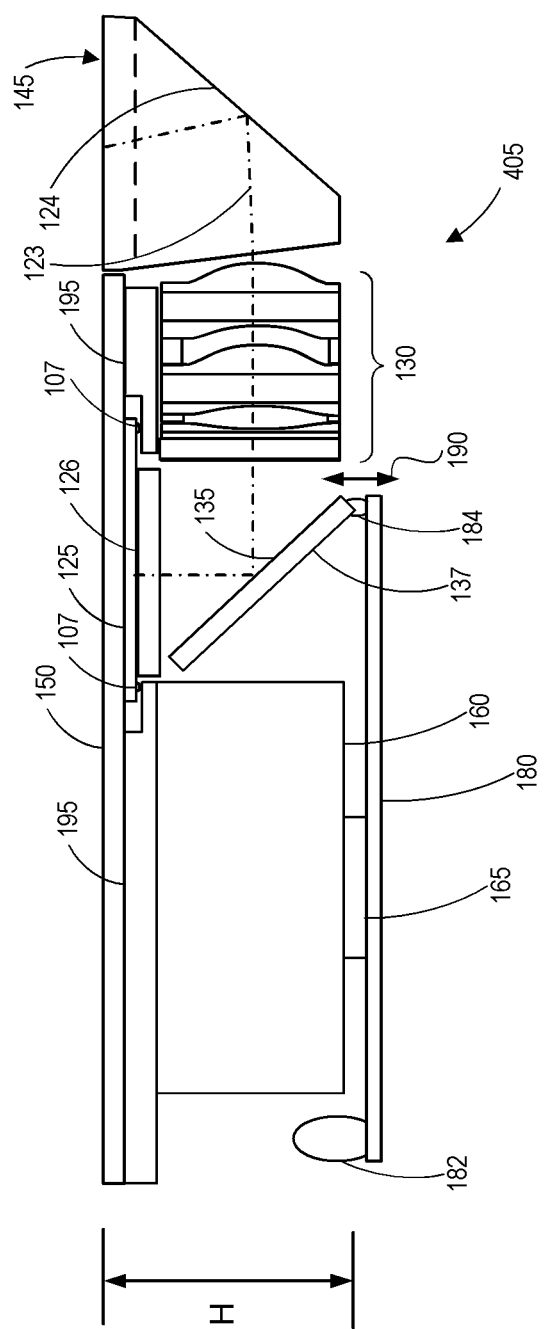
FIG. 4A illustrates an embodiment of a folded optic assembly autofocus system with a secondary light folding surface that includes a mirror.

FIG. 4A illustrates an example of an embodiment of the autofocus assembly in a folded optic assembly 405 using a mirror 137 as the secondary light folding surface 135. The folded optic assembly 405 includes mirror 137, lens assembly 130, primary light folding surface 124 incorporated in prism 145, cover glass 126, and sensor 125. As illustrated, sensor 125 is mounted within a rectangular slot formed in the printed circuit board 195. Stud bumps 107 are part of the sensor 125 and are used to make contact with electrically conducting pads on the printed circuit board 195. The printed circuit board 195 is mounted on substrate 150 and remains stationary relative to the substrate 150. This is just one example of how the sensor 125 can be mounted to the substrate 150 and make electrical contact with a printed circuit board like 195.

In the embodiment illustrated in FIG. 4A, a VCM 160 is positioned adjacent to the folded optic assembly 405. Although only one folded optic assembly 405 is shown, a VCM could be placed adjacent to each folded optic assembly 405 in the array in some embodiments. The VCM movement is perpendicular to optical axis 123 passing through the lens assembly 130 and perpendicular to a plane formed by the substrate 150, and such movement 190 may be transferred (for example, directly transferred) to the mirror 137, which can be extremely light.

As illustrated, light representing a portion of the target image scene enters prism 145 and follows optical path 123 (to pass) through lens assembly 130. Lens assembly 130 can focus the light, which then travels to secondary light folding surface 135 to be redirected onto sensor 125. The movement 190 of the secondary reflective surface, a mirror 135 changes the path length of the focused light received from the lens assembly before the light is incident on the sensor 125. For example, moving the secondary reflective surface 135 toward the sensor 135 shortens the optical path length, while moving secondary reflective surface 135 away from the sensor 135 lengthens the optical path length. Such movement of the secondary reflective surface 135 can shift the location of the image on the sensor. Accordingly, the sensor 125 can be sized and positioned to receive light from the secondary reflective surface 135 throughout the range of movement 190, such that some portions of sensor 125 may be unused at various positions of the secondary reflective surface 135.

Still referring to FIG. 4A, the VCM 160 includes a movable part and a stationary body 160. The stationary body VCM 160, fixed on the printed circuit board 195 (as shown) coupled to the substrate 150 (or in other embodiments, the VCM 160 may be coupled directly to the substrate 150) can include a permanent magnet and an iron yoke to produce a magnetic field through the air gap of the magnetic circuit. The movable part can include a coil winding (not shown) and a power cable (not shown) with one end being connected to the coil winding, as well as a driving member 165 threaded within the coil winding. When a current is supplied to the coil winding, the coil winding will move through the air gap as a result of the interaction between the current and the magnetic field, moving the driving member 165 up and down. In some embodiments, and in the embodiment illustrated in FIG. 4A, the driving member 165 contacts a lever 180, and the second light folding surface 135 can be coupled to one end of the lever 180, for example by a coupling 184 (for example, glue or another adhesive or another mechanical coupling). An optional counterweight 182 may be coupled to the other end of the lever 180 can balance the motion 190 of the mirror. The counterweight may be, for example a 0.02 g counterweight.

Such a mechanism is very light and by positioning the VCM 160 vertically within the array camera, the approximately 4.0 mm height of the body of the VCM 160 does not increase the overall height of the array. The driving member 165 can protrude slightly from the stationary body of the VCM 160 and would move, for example, up to approximately 120 microns to approximately 150 microns to effectively change focus considering the relatively long focal length for the folded optic assembly (note that the present example is at 6 mm focal length instead of the typical 4 mm). The lever 180 can be a very thin, elongate piece of material suitable for transferring the movement of the driving member 165 to the mirror 137. As such, the driving member 165, movement 190, and lever 180 do not significantly add to the overall height of the array camera. The VCM 160 movement is agile and very fast, and requires low friction to operate properly. This can be achieved by this disclosed lever mechanism, and additionally by the extremely low weight mirror.

The illustrated autofocus assembly can use a standard camera VCM, as is typically provided directly from a mass manufacturer, with an added driving member 165, lever 180, counterweight 182, and mirror. Using a standard VCM enables easy manufacture of the autofocus assembly.

Figure 4B:
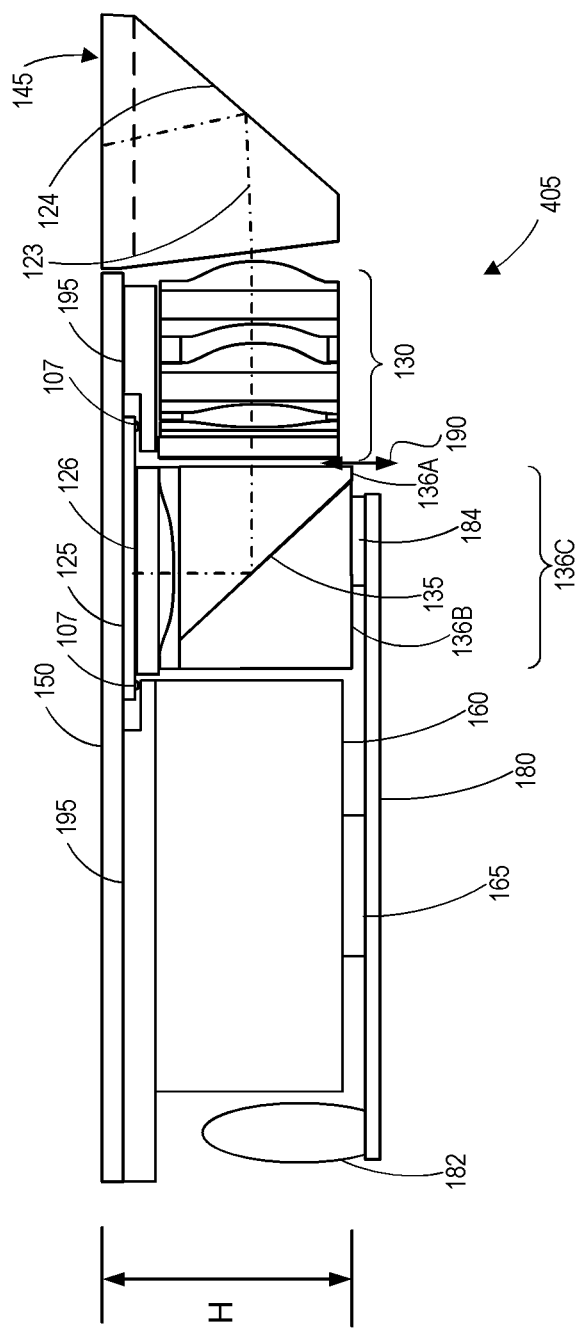
FIG. 4B illustrates an embodiment of a folded optic assembly autofocus system with a secondary light folding surface that includes a prism.

FIG. 4B illustrates an example of an embodiment of the autofocus assembly in a folded optic assembly 405 using the optical element 136C (illustrated as including prism 136A and support block 136B) to form the second light redirecting surface 135 which is a prism. Some embodiments can include a reflective coating between prism 136A and support block 136B. As illustrated, the VCM 160 can be placed adjacent to the folded optic assembly, and the driving member 165 of the VCM 160 is coupled to the optical element 136C by lever 180 at coupling 184, which can be a layer of adhesive in some embodiments. Due to the higher weight of the optical element 136C relative to the mirror 137 discussed above with respect to FIG. 6A, the counterweight 182 should be suitably large to balance the optical element 136C. The higher weight of the optical element 136C and counterweight 182 can beneficially reduce possible vibrations from the VCM 160 during movement 190.

Figure 4C:
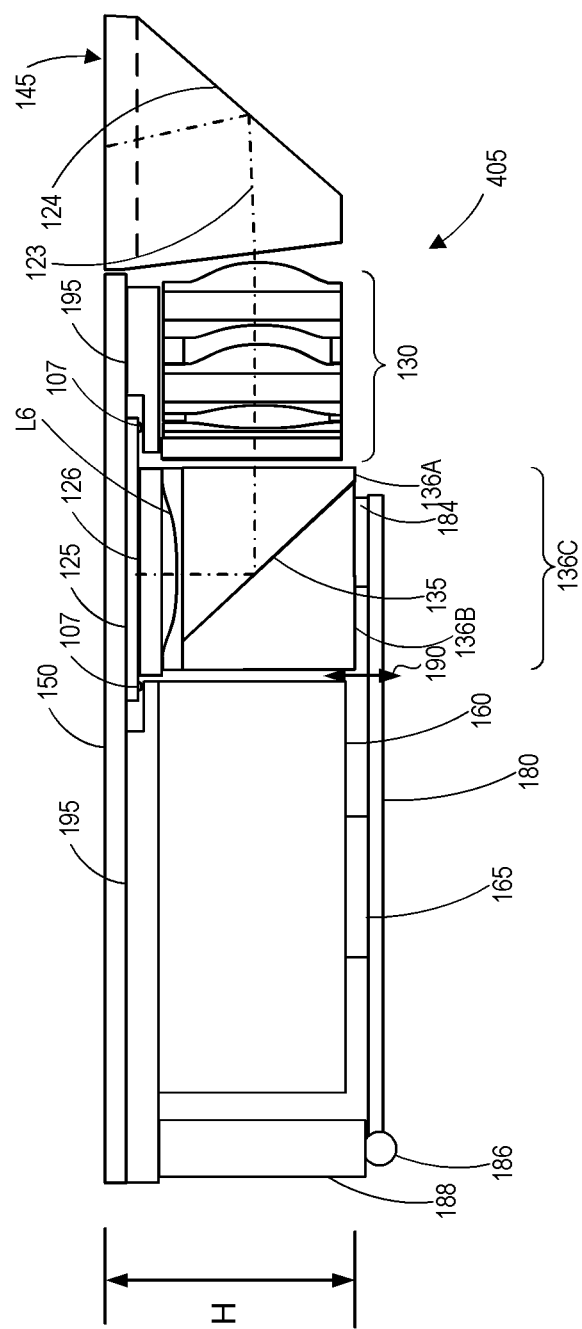
FIG. 4C illustrates an embodiment of a folded optic assembly autofocus system having a lever characterized as a lever third class.

FIG. 4C illustrates an example of an embodiment of the autofocus assembly in a folded optic assembly with an added strut 188 for leverage. The embodiment illustrated in FIG. 4C includes an optical element 136C including a prism 136A and a support block 136B to form the second light redirecting surface 135. In various embodiments, the second light redirecting surface can be a prism or a mirror. For example, as illustrated in FIG. 4A the strut 188 can be implemented in a folded optic assembly 405 with a mirror 137 as the second light redirecting surface 135. A first end of the lever 180 is coupled to the strut 188, a middle portion of the lever 180 contacts the driving member 165 of the VCM 160, and a second end of the lever 180 is coupled to the optical element (coupling 184). The strut 188 provides added leverage and stability to the movement of the lever 180. In this embodiment, the lever 180 can be characterized, for example, as a lever third class. Accordingly, no counterweight is needed. The lever 180 can be a thin, spring-like piece of metal in some embodiments capable of flexing due to movement of the driving member 165 of the VCM 160. The strut 188 can be coupled to the lever at a hinge 186, which could be a pivot, flexible coupling, weld, or bent piece of metal in various embodiments. Such a design can increase the extent of motion 190 needed for a camera with a long focal length in some embodiments, and/or can prevent "see-saw" movement (back and forth tipping of lever 180) around the VCM.

Figure 4D:
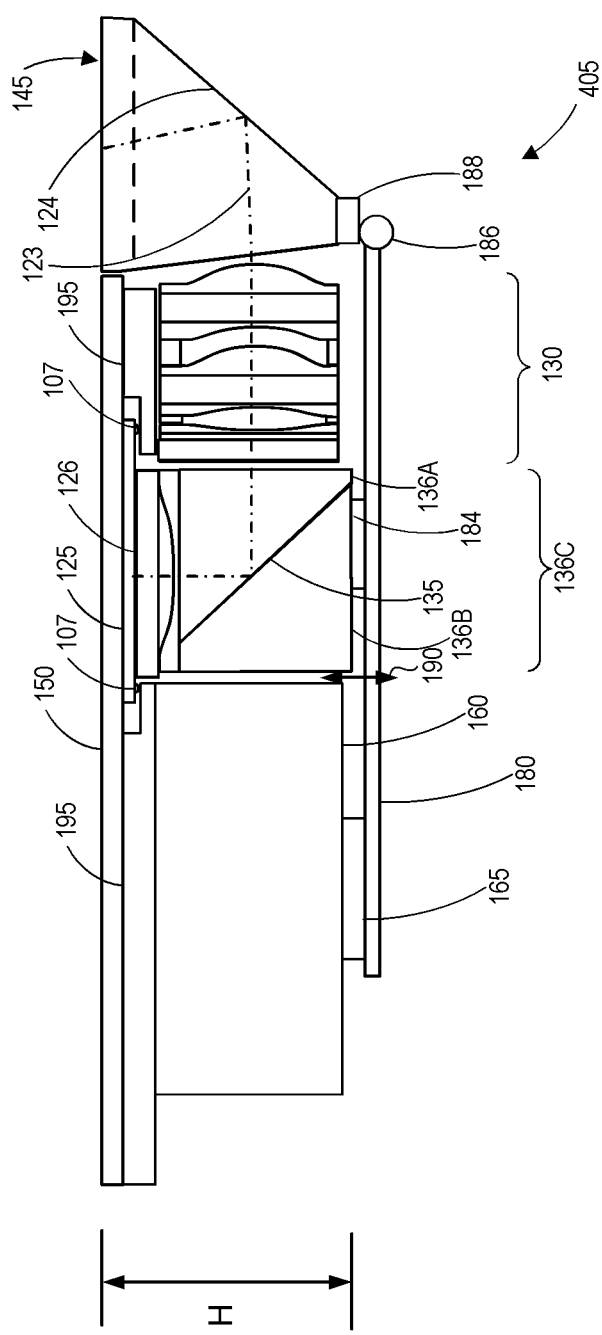
FIG. 4D illustrates an embodiment of a folded optic assembly autofocus system having a lever characterized as a lever second class.

FIG. 4D illustrates another embodiment of the autofocus assembly implementing leverage in movements related to auto-focus. A first end of the lever 180 is coupled to the driving member 165 of the VCM 160, a middle portion of the lever is coupled at coupling 184 to the optical element (illustrated as prism 136A and block 136B but in other embodiments this could be the mirror 137), and a second end of the lever 180 is coupled to a lower portion of the central prism 145. As illustrated, the strut 188 and hinge 186 are positioned between the second end of the lever 180 and the prism 145. In this embodiment, the lever 180 can be characterized, for example, as a lever second class. In some embodiments, the lever 180 can be glued or otherwise coupled directly to the lower portion of the central prism 145. FIG. 4D illustrates another way of providing leverage and stability to the autofocus assembly such that no counterweight is needed. Such a design can decrease the extent of motion 190 needed for a camera with a short focal length in some embodiments, and/or can prevent "see-saw" movement around the VCM.

In any of FIGS. 4A through 4D, instead of prism 145 a reflective surface can be implemented. In addition, the particular lens configurations are representative of various examples but are not intended to limit the folded optic assembly. Further, in some embodiments the first light directing surface (prism 145) can be omitted and light can enter the assembly directly through lens assembly 130. In other embodiments the VCM may be coupled to the first light directing surface (prism 145) to move that surface and the secondary light directing surface can be omitted with the sensor repositioned to receive light directly from the lens assembly 130. The VCM implementations described in FIGS. 4A through 4D can be beneficial for autofocus in any thin folded optic camera in which a VCM cannot be positioned with the lens assembly threaded through the interior of the VCM as is conventional due to height limitations on the system by providing a range of focus values by moving a light folding surface through a small range of the overall camera height.

Figure 5A:
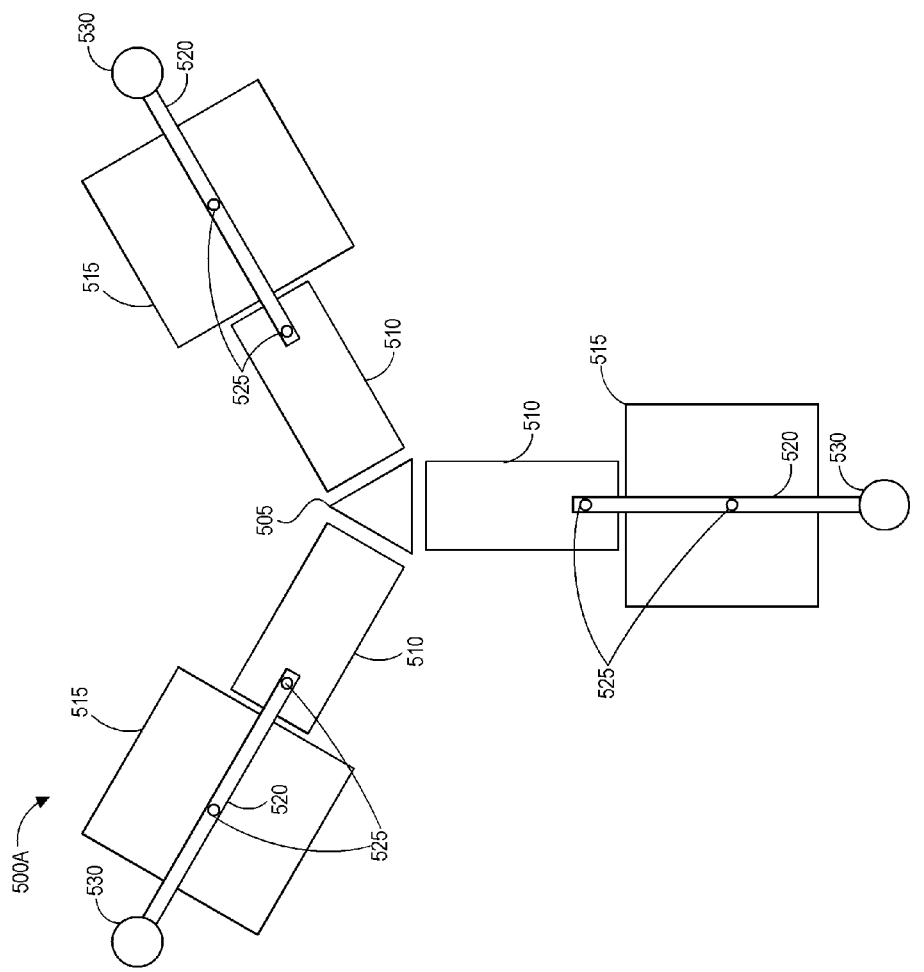
FIGS. 5A-5C illustrate various embodiments of a folded optic array camera autofocus system.
Figure 5B:
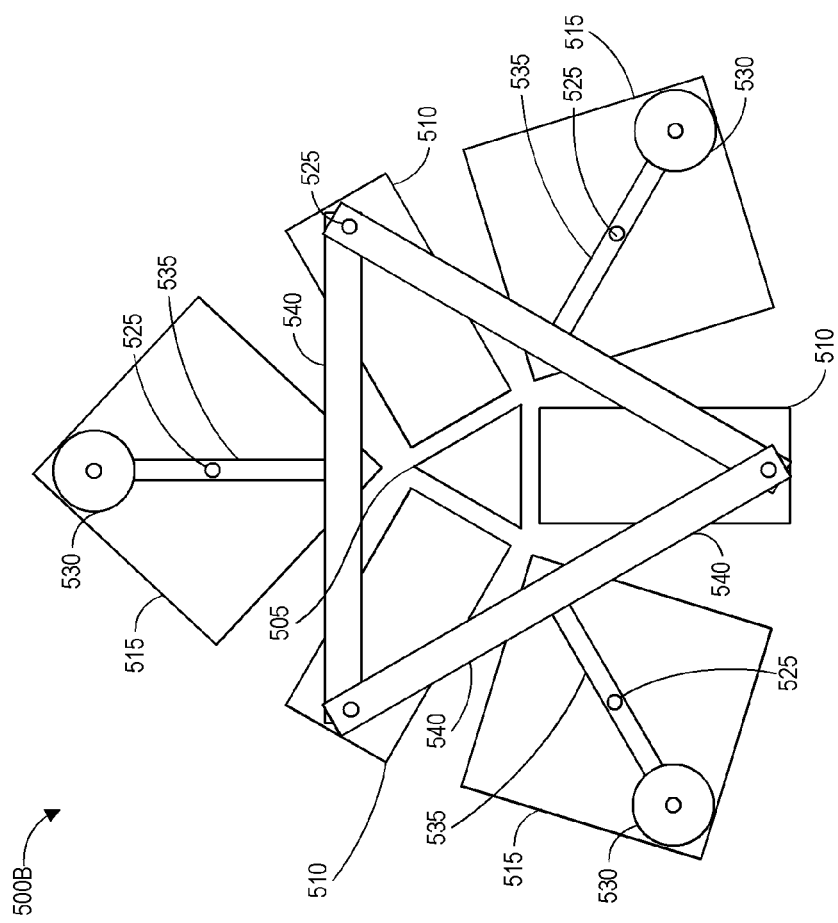
Figure 5C:
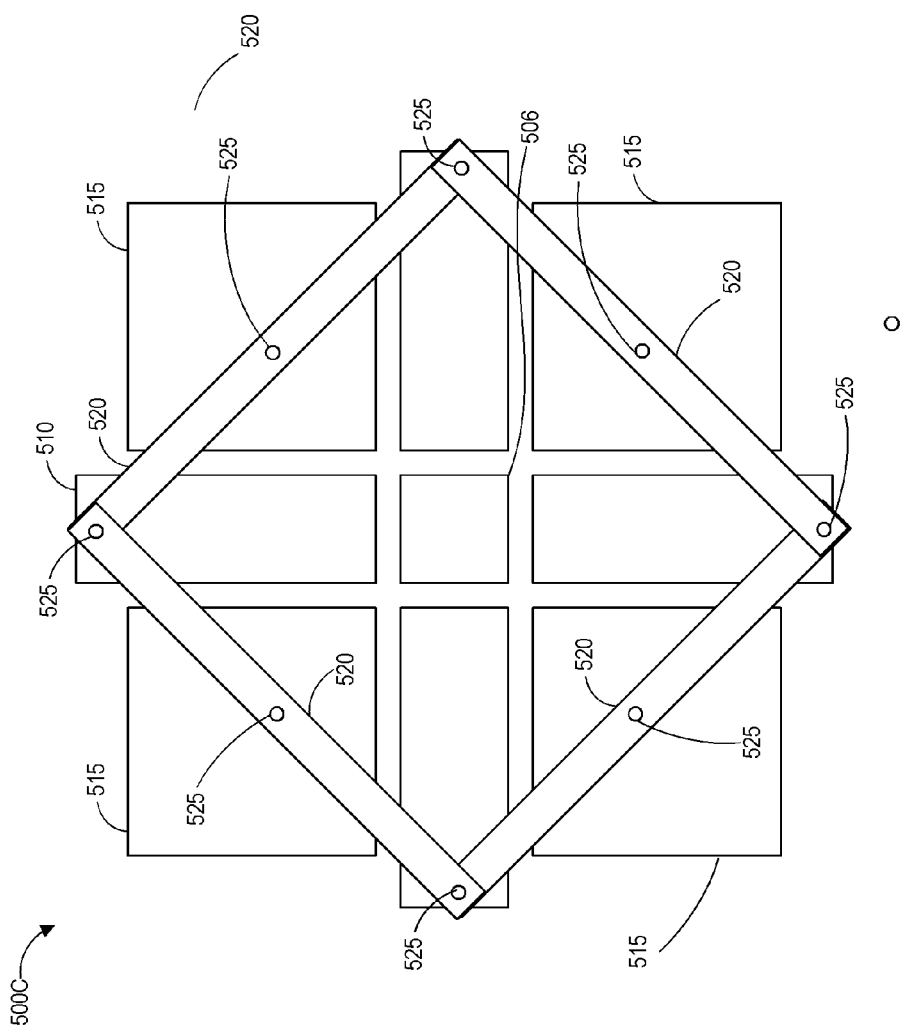

FIGS. 5A-5C illustrate various embodiments of a folded optic array camera autofocus system 500A, 500B, 500C including a number of VCMs 515 and a number of folded optic assemblies 510.

FIG. 5A illustrates an embodiment of an array camera autofocus system 500A for an array camera having three folded optic assemblies 510. The system 500A includes an object prism (or pyramid) 505, and three individual cameras 510, each associated with a VCM focusing motor mechanism 515. The folded optic assemblies 510 can include any of the configurations described herein for lens assemblies, secondary light folding surfaces, and image sensors, and are positioned around a first light folding surface 505, which may be a prism or mirrored pyramid configured to split light representing the target image scene into multiple portions and direct each portion through a corresponding folded optic assembly 510. Autofocus for each folded optic assembly 510 is controlled by a corresponding VCM 515. Each VCM may be coupled to the corresponding folded optic assembly 510 via a lever 520 and couplings 515, as well as to a counterweight 530. Any of the combinations of lever, counterweight, and/or strut discussed above can be implemented instead of the illustrated embodiment. Such a design can be implemented with different camera arrays including varying numbers of folded optic assemblies 510 and correspondingly varying primary light folding surfaces 505, though the illustrated example is a three-camera case.

The movement of each VCM 515 can be carefully controlled, for example by a controller with programmable computer instructions (not illustrated), to keep all folded optic assemblies 510 focused at the same distance. Electronic communication can be provided between the controller and some or all VCMs 515. The controller can compute the movement needed for each folded optic assembly so that all folded optic assemblies 510 are focused at the same distance at the same time. In one example, the second light directing surface of each of the folded optic assemblies 510 can be moved the same amount. However, due to manufacturing variation, in some embodiments the movement of the second light directing surface of each of the folded optic assemblies 510 can be calibrated to account for the variation, for example based on a coefficient defining a relationship between the folded optic assemblies 510. In some embodiments, one folded optic assembly 510 can be selected as a "driver" to use for deciding where to focus the other assemblies.

FIG. 5B illustrates a compact design for a three-camera array autofocus system 500B. Each VCM 515 is mechanically linked to one counterweight 530 by a first lever 535 and to two adjacent folded optic assemblies 510 by a second lever 540 extending between the adjacent folded optic assemblies 510. The first lever 535 and second lever 540 can be separate levers coupled together, or can form one solid T-shaped piece in some embodiments. The motion of each VCM 515 is accordingly distributed between the two adjacent folded optic assemblies, and the motion of the second light directing surface of each folded optic assembly is affected by the two neighboring VCMs. Although a triangular linkage between three VCMs for three folded optic assemblies is shown, other embodiments can have other numbers of VCMs and folded optic assemblies and/or other configurations of linkages between the folded optic assemblies 510, for example a circular, hexagonal, or rectangular linkage, to name a few examples.

An example of autofocus control for the system of FIG. 5B can provide the mirror displacement when VCM movement is known, or can provide the needed VCM movement for a known needed mirror displacement. The displacements of all individual motors can be described by a 3D vector, $X=(x, y, z)$. The displacements of all individual second reflective surfaces can be described by a 3D vector, $V=(u, v, w)$.

Surface and motor displacements are related by $V=AX$, where A is the matrix of the transform:

$$A = \begin{matrix} 0.5 & 0.5 & 0.0 \\ 0.0 & 0.5 & 0.5 \\ 0.5 & 0.0 & 0.5 \end{matrix}$$

Accordingly, multiplying the motor displacement vector X by the transformation matrix A can provided the corresponding movement of the second reflective surfaces. In typical autofocus techniques, the second reflective surface displacements needed for focusing are known, and the corresponding motor movements are needed. The corresponding motor movements can be found using $X=A^{-1} V$, where the inverse transform $A^{-1}$ is:

$$A^{-1} = \begin{matrix} 1 & -1 & 1 \\ 1 & 1 & -1 \\ -1 & 1 & 1 \end{matrix}$$

The resulting values of x, y, and z indicate the motor movement needed for the known second reflective surface displacement. Such values of x, y, z can be provided to a motor control system to produce the needed autofocus movement. As a result, the movement of all second reflective surfaces can be exactly known, and the movement of the captured images follows directly. This movement can be accounted for in the stitching techniques used to generate the final image.

Although specific vectors and matrices are discussed above, these are provided as one example for the specific three VCM, three folded optic assembly, and triangular linkage embodiment of FIG. 5B. The sizes and values of the vectors and matrices can change based on the number of, and linkages between, the VCMs and folded optic assemblies in other array camera autofocus embodiments. Such embodiments preferably have a 1:1 correspondence between movement of motors and movement of second reflective surfaces so that displacement can be precisely computed.

FIG. 5C illustrates a compact design for a four-camera array autofocus system 500C. The array includes four VCMs 515 and four folded optic assemblies 510 positioned around primary light folding surfaces of central mirror pyramid or prism 506. Each VCM 515 is mechanically linked, using a lever 520, to two adjacent folded optic assemblies 510. As illustrated, no counterweight is provided due to the direct mechanical linkage between the VCMs and the folded optic assemblies. In some embodiments, additional linkages can be provided diagonally across the array (e.g., from the upper right VCM to the lower left VCM and/or from the upper left VCM to the lower right VCM). Such a design makes efficient use of space, occupying substantially the same rectangular area as the array camera without the autofocus system.

In the array camera autofocus system examples herein, a VCM motor is shown and described as actuating the lever to move the second light directing surface for changing the focus position. However, in other embodiments the VCM could be replaced by a piezo stepper motor or by a micro-electromechanical systems (MEMS) motor.

IV. Overview of Example Image Capture Process

Figure 6:
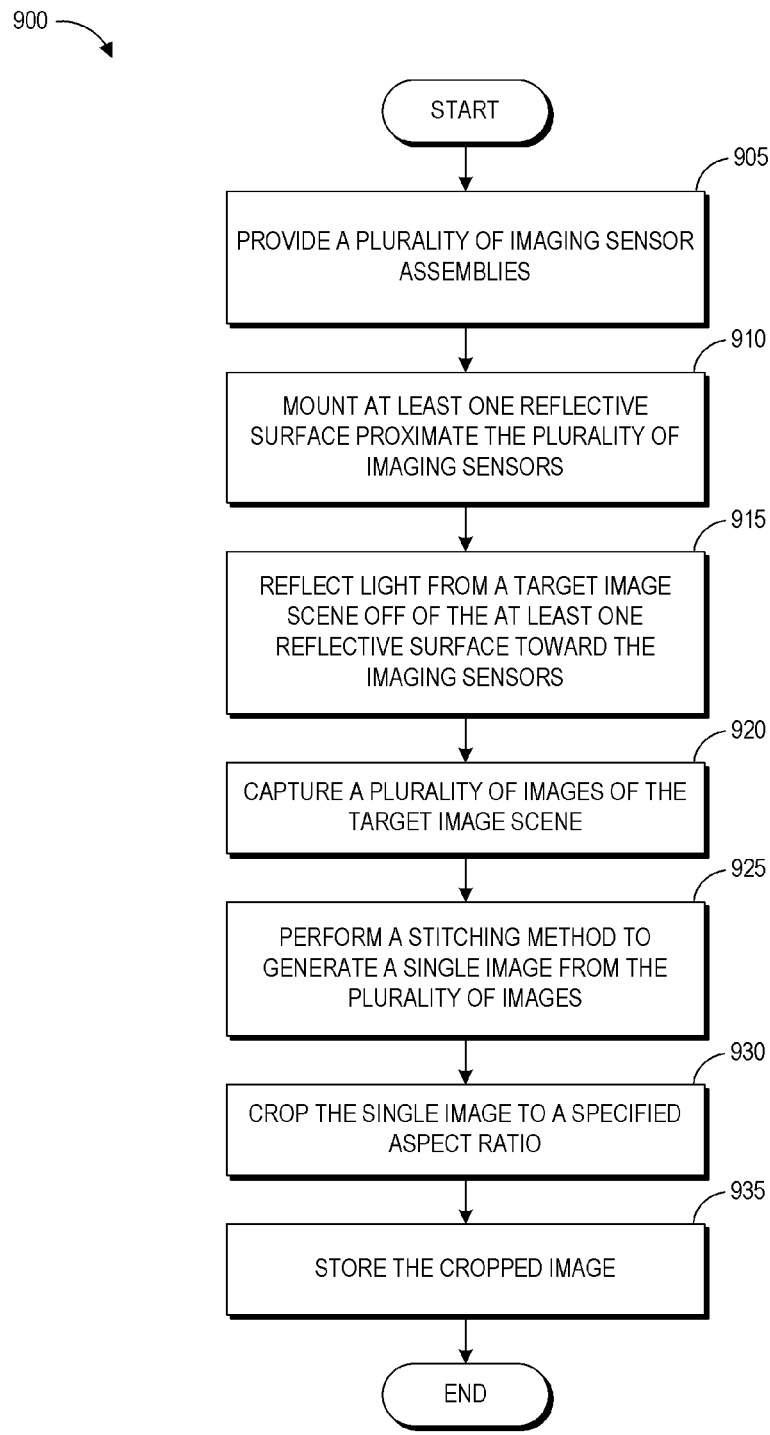
FIG. 6 illustrates an embodiment of a folded optic image capture process.

FIG. 6 illustrates an embodiment of a folded optic image capture process 900. The process 900 begins at block 905, in which a plurality of imaging sensor assemblies are provided. This can include any of the sensor array configurations discussed above with respect to the previous images. The sensor assemblies may include, as discussed above with respect to FIG. 3, a sensor, lens system, and a reflective or refractive surface positioned to redirect light from the lens system onto the sensor.

The process 900 then moves to block 910, in which at least one light folding surface is mounted proximate to the plurality of image sensors. For example, this step could comprise mounting a central mirror pyramid or prism between two rows of sensor arrays, wherein the central mirror pyramid or prism comprises a surface or facet associated with each sensor in the arrays.

The process 900 then transitions to block 915, in which light comprising a target image of a scene is redirected using the at least one light folding surface toward the imaging sensors. For example, a portion of the light may be redirected off of each of a plurality of surfaces toward each of the plurality of sensors. This may further comprise passing the light through a lens assembly associated with each sensor, and may also include redirecting the light using a second surface onto a sensor.

Block 915 may further comprise focusing the light using the lens assembly and/or through movement of any of the light folding surfaces, for example by providing at least one VCM configured to move a light folding surface along an axis substantially parallel to the height of the array, as described above. Accordingly, block 915 can incorporate the VCM control techniques discussed above for synchronizing the focusing provided by multiple VCMs for multiple folded optic assemblies.

The process 900 may then move to block 920, in which the sensors capture a plurality of images of the target image scene. For example, each sensor may capture an image of a portion of the scene corresponding to that sensor's field of view. Together, the fields of view of the plurality of sensors cover at least the target image in the object space.

The process 900 then may transition to block 925 in which an image stitching method is performed to generate a single image from the plurality of images. In some embodiments, the image stitching module 240 of FIG. 2 may perform the stitching. This may include known image stitching techniques. Further, any areas of overlap in the fields of view may generate overlap in the plurality of images, which may be used in aligning the images in the stitching process. For example, block 925 may further include identifying common features in the overlapping area of adjacent images and using the common features to align the images.

Next, the process 900 transitions to block 930 in which the stitched image is cropped to a specified aspect ratio, for example 4:3 or 1:1. Finally, the process ends after storing the cropped image at block 935. For example, the image may be stored in storage 210 of FIG. 2, or may be stored in working memory 205 of FIG. 2 for display as a preview image of the target scene.

V. Implementing Systems and Terminology

Implementations disclosed herein provide systems, methods and apparatus for autofocusing multiple sensor array cameras. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An autofocus module for a folded optic array camera, comprising:
    a folded optic assembly including
        an image sensor mounted to a substrate, the substrate defining a first plane;
        a first reflective surface; and
        a second reflective surface, the first reflective surface positioned to receive light representing a portion of a scene and reflect the light toward the second reflective surface, and the second reflective surface positioned to receive the light from the first reflective surface and reflect the light toward the image sensor;
    an actuator mounted to the substrate and including a driving member positioned for movement in a direction orthogonal to the plane of the substrate;
    a lever in contact with the driving member and second reflective surface such that the movement of the driving member is transferred to the second reflective surface via the lever; and
    a counterweight coupled to a first end of the lever, wherein the driving member is coupled to a middle portion of the lever and the second reflective surface is coupled to a second end of the lever.

2. The autofocus module of claim 1, wherein the actuator comprises a voice coil motor.

3. The autofocus module of claim 2, wherein the driving member is threaded within a coil of the voice coil motor.

4. The autofocus module of claim 1, wherein the movement in the direction orthogonal to the substantially horizontal plane is within a range of approximately 120 microns to approximately 150 microns.

5. The autofocus module of claim 1, further comprising a lens assembly positioned between the first reflective surface and the second reflective surface.

6. The autofocus module of claim 5, wherein a diameter of the lens assembly is approximately 4 mm.

7. The autofocus module of claim 1, wherein a weight of the counterweight is selected to at least partially balance a weight of the second reflective surface.

8. The autofocus module of claim 7, wherein the second reflective surface comprises one of a reflective mirror and a prism.

9. An autofocus module for a folded optic array camera, comprising:
    a folded optic assembly including
        an image sensor mounted to a substrate, the substrate defining a first plane;
        a first reflective surface; and
        a second reflective surface, the first reflective surface positioned to receive light representing a portion of a scene and reflect the light toward the second reflective surface, and the second reflective surface positioned to receive the light from the first reflective surface and reflect the light toward the image sensor;
    an actuator mounted to the substrate and including a driving member positioned for movement in a direction orthogonal to the plane of the substrate; and
    a lever in contact with the driving member and second reflective surface such that the movement of the driving member is transferred to the second reflective surface via the lever, and
    a strut coupled to a first end of the lever using a hinge, wherein the lever comprises a first end coupled to the driving member and a second end coupled to the structure comprising the additional reflective surface via one or both of a strut and a hinge, wherein a middle portion of the lever is coupled to the reflective surface.

10. The autofocus module of claim 9, wherein the strut is coupled to a structure forming the first reflective surface, and wherein the second reflective is coupled to a middle portion of the lever and the driving member is coupled to a second end of the lever.

11. The autofocus module of claim 1, wherein a first end of the lever is coupled to a structure forming the first reflective surface, and wherein the second reflective surface is coupled to a middle portion of the lever and the driving member is coupled to a second end of the lever.

12. A method for capturing an image of a target image scene using a folded optic array camera comprising a plurality of folded optic assemblies mounted to a substrate defining a first plane and positioned around a structure providing a corresponding plurality of light folding surfaces, the method comprising:
for each of the plurality of folded optic assemblies:
causing movement of a driving member of an actuator in a direction orthogonal to the plane of the substrate;
transferring the movement of the driving member to a second light directing surface, thereby changing a focal distance of light representing a portion of the target image scene, the corresponding light folding surface of the plurality of light folding surfaces positioned to direct the light toward the second light directing surface and the second light directing surface positioned to direct the light toward an image sensor; and
capturing an image representing the portion of the light using the image sensor.

13. The method of claim 12, wherein transferring the movement is accomplished by a lever in contact with the driving member and second light directing surface.

14. The method of claim 12, further comprising keeping each of the plurality of folded optic assemblies focused at approximately the same distance.

15. The method of claim 14, further comprising determining an amount of movement for a selected driver assembly of the plurality of folded optic assemblies and using the amount of movement for the selected driver assembly to determine movement for each of the other of the plurality of folded optic assemblies.

16. The method of claim 15, wherein determining movement for each of the other of the plurality of folded optic assemblies is based at least partly on the amount of movement for the selected driver assembly and at least partly on one or more coefficients defining a relationship between the plurality of folded optic assemblies.

17. The method of claim 12, further comprising performing a stitching operation on the image representing the portion of the light from each of the plurality of folded optic assemblies to form the image of the target image scene.

18. An autofocus module for a folded optic array camera, comprising:
an image sensor defining a first plane, the image sensor configured to receive light representing at least a portion of a target image scene;
a lens assembly configured to focus the light, the lens assembly having an optical axis;
a reflective surface positioned between the lens assembly and the image sensor to reflect the light received from the lens assembly onto the image sensor;
an actuator comprising a driving member positioned for movement in a direction perpendicular to the optical axis of the lens assembly;
a lever coupled to the driving member and the reflective surface to transfer movement of the driving member to the reflective surface in the direction perpendicular to the optical axis for changing an optical path length of the light; and
a counterweight coupled to a first end of the lever, wherein a middle portion of the lever coupled to the driving member and a second end of the lever coupled to the second reflective surface.

19. The autofocus module of claim 18, wherein the lens assembly is positioned so that the optical axis runs substantially parallel to the first plane.

20. The autofocus module of claim 18, further comprising a strut coupled to a first end of the lever, a middle portion of the lever coupled to the driving member and a second end of the lever coupled to the reflective surface.

21. The autofocus module of claim 18, further comprising a plurality of cameras, a first camera of the plurality of cameras comprising the autofocus module comprising the folded optic assembly, the actuator, and the lever.

22. An autofocus module for a folded optic array camera, comprising:
an image sensor mounted to a substrate defining a first plane;
a first light directing surface;
a second light directing surface, the first light directing surface positioned to direct light representing a portion of a target image scene toward second light directing surface, and the second light directing surface positioned to direct the light toward the image sensor;
an actuator mounted to the substrate and including a driving member positioned for movement in a direction orthogonal to the plane of the substrate; and
a lever in contact with the driving member and second light directing surface such that the movement of the driving member is transferred to the second light directing surface via the lever, wherein the movement in the direction orthogonal to the substantially horizontal plane is within a range of approximately 120 microns to approximately 150 microns.

23. The autofocus module of claim 22, further comprising a counterweight coupled to a first end of the lever, wherein the driving member is coupled to a middle portion of the lever and the second light directing surface is coupled to a second end of the lever.

24. The autofocus module of claim 22, further comprising a strut coupled to a first end of the lever using a hinge, wherein the driving member is coupled to a middle portion of the lever and the second light directing surface is coupled to a second end of the lever.

25. The autofocus module of claim 9, wherein the driving member is coupled to a middle portion of the lever and the second reflective surface is coupled to a second end of the lever.

26. An autofocus module for a folded optic array camera, comprising:
an image sensor defining a first plane, the image sensor configured to receive light representing at least a portion of a target image scene;
a lens assembly configured to focus the light, the lens assembly having an optical axis;
reflective surface positioned between the lens assembly and the image sensor to reflect the light received from the lens assembly onto the image sensor;

an actuator comprising a driving member positioned for movement in a direction perpendicular to the optical axis of the lens assembly; and means for transferring the movement of the driving member to the reflective surface in the direction perpendicular to the optical axis for changing an optical path length of the light, wherein the lever comprises a first end coupled to the driving member and a second end coupled to the structure comprising the additional reflective surface via one or both of a strut and a hinge, wherein a middle portion of the lever is coupled to the reflective surface.

* * * * *